United States Patent
de Jong

(10) Patent No.: US 9,494,744 B2
(45) Date of Patent: Nov. 15, 2016

(54) FIBER OPTIC CONNECTOR HAVING A MAIN CONNECTOR BODY AND A PLURALITY OF REMOVABLE SUB-CONNECTORS

(71) Applicant: CORNING OPTICAL COMMUNICATIONS LLC, Hickory, NC (US)

(72) Inventor: Michael de Jong, Colleyville, TX (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/537,213

(22) Filed: Nov. 10, 2014

(65) Prior Publication Data

US 2016/0131854 A1    May 12, 2016

(51) Int. Cl.
*G02B 6/38* (2006.01)
*G02B 6/40* (2006.01)
*G02B 6/42* (2006.01)

(52) U.S. Cl.
CPC ........... *G02B 6/3879* (2013.01); *G02B 6/3821* (2013.01); *G02B 6/3825* (2013.01); *G02B 6/3885* (2013.01); *G02B 6/3893* (2013.01); *G02B 6/406* (2013.01); *G02B 6/4246* (2013.01); *G02B 6/4292* (2013.01)

(58) Field of Classification Search
CPC  G02B 6/3879; G02B 6/3821; G02B 6/3825; G02B 6/3893; G02B 6/406
USPC ......................................................... 385/59
See application file for complete search history.

(56) References Cited

U.S. PATENT DOCUMENTS

| | | | |
|---|---|---|---|
| 5,727,101 A * | 3/1998 | Giebel | G02B 6/3834 385/59 |
| 5,991,058 A | 11/1999 | Feuer et al. | 359/125 |
| 6,422,760 B1 | 7/2002 | Matasek et al. | |
| 6,464,403 B1 | 10/2002 | Koch et al. | 385/53 |
| 6,498,876 B1 | 12/2002 | Liu et al. | 385/34 |

(Continued)

FOREIGN PATENT DOCUMENTS

EP    1116974 A2    7/2001    ............... G02B 6/38

OTHER PUBLICATIONS

International Search Report and Written Opinion of the International Searching Authority; PCT/US2015/059423; Mailed Feb. 19, 2016; 11 Pages.

*Primary Examiner* — Sung Pak

(57) ABSTRACT

A fiber optic connector comprising a main connector body having a plurality of removable sub-connectors retained therein is disclosed. Each sub-connector has a ferrule for retaining a pair of optical fibers, such as a transmit/receive pair for example. When the main connector body of the fiber optic connector is inserted into a receptacle, each of the optical fibers retained in each ferrule of the plurality of sub-connectors is optically connected to the fiber optic receptacle. In this manner, the fiber optic connector can connect and disconnect a plurality of optical fibers in the sub-connectors at the same time. Additionally, individual sub-connectors can be removed, rearranged and replaced, without disturbing the optical connections of the other sub-connectors. This arrangement thus eliminates the need for breakout cables or other bulky solutions to convert between different multi-fiber and duplex applications.

19 Claims, 14 Drawing Sheets

(56) References Cited

U.S. PATENT DOCUMENTS

| | | | |
|---|---|---|---|
| 6,592,268 B2 * | 7/2003 | Chen | G02B 6/3879 385/56 |
| 6,604,861 B2 | 8/2003 | Chen et al. | 385/56 |
| 6,688,782 B1 | 2/2004 | Dean, Jr. et al. | 385/78 |
| 6,811,321 B1 * | 11/2004 | Schmalzigaug | G02B 6/3821 385/53 |
| 7,422,376 B2 * | 9/2008 | Chen | G02B 6/3821 385/78 |
| 8,348,516 B2 | 1/2013 | Roth | 385/53 |
| 8,403,570 B2 | 3/2013 | Fisher et al. | 385/78 |
| 2004/0131317 A1 | 7/2004 | Grzegorzewska et al. | |
| 2007/0217741 A1 | 9/2007 | Shigenaga et al. | |
| 2014/0105547 A1 | 4/2014 | Baca et al. | 385/78 |

* cited by examiner

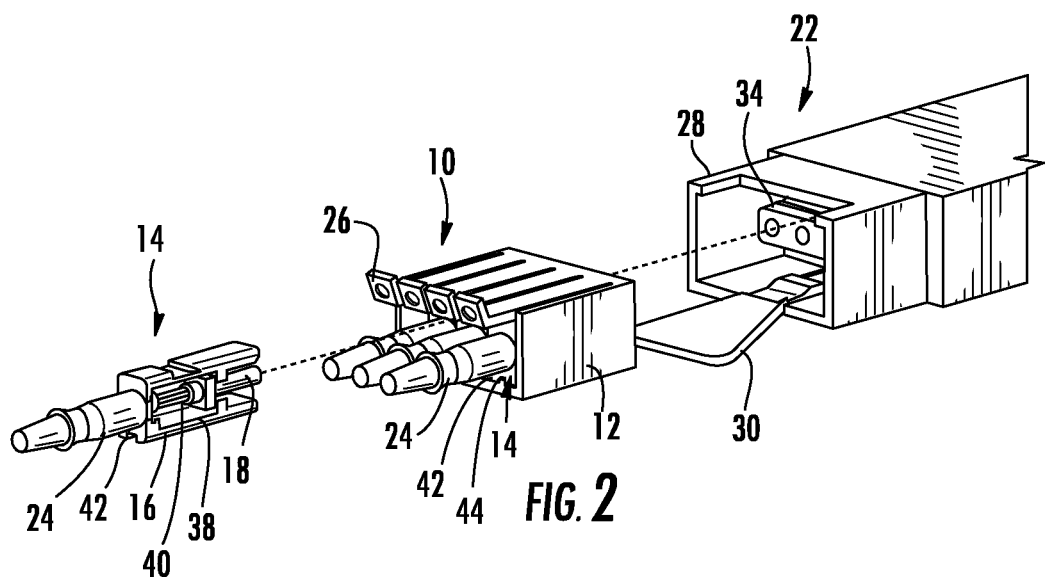

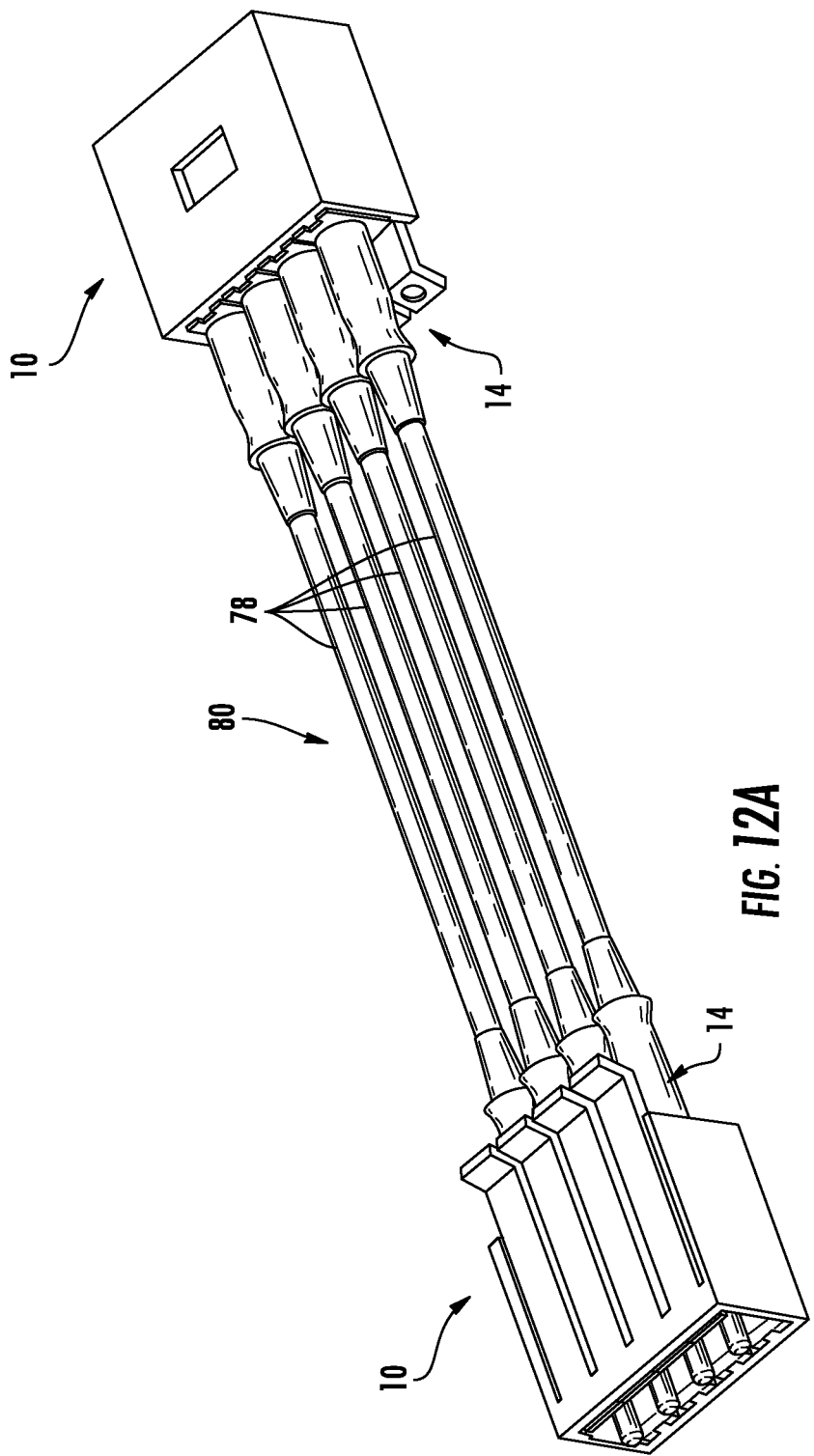

FIBER OPTIC CONNECTOR HAVING A MAIN CONNECTOR BODY AND A PLURALITY OF REMOVABLE SUB-CONNECTORS

BACKGROUND

The disclosure relates generally to fiber optic connectors and more particularly to a fiber optic connector having a main connector body and a plurality of removable sub-connectors. The main connector body secures and aligns the removable sub-connectors and may be coupled with a suitable interface such as a receptacle, adapter, or a conversion assembly.

Benefits of utilizing optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed for use in delivering voice, video, and data transmissions to subscribers over both private and public networks. These fiber optic networks often include separated connection points linking optical fibers to provide "live fiber" from one connection point to another. In this regard, fiber optic equipment is located in data distribution centers or central offices to support live fiber interconnections. For example, the fiber optic equipment can support interconnections between servers, storage area networks (SANs), and/or other equipment at data centers. Interconnections may be further supported by fiber optic patch panels or modules.

Data centers and other installations may employ high speed fiber optic links using parallel transceivers to connect switches within the data center. For example, a Quad Small Form-factor Pluggable (QSFP) parallel transceiver, commonly used in these types of installation, uses four transmit and four receive channels to achieve a high combined data rate. For example, four 10 GB/s channels achieve a combined 40 GB/s transmission speed, or four 25 GB/s channels can achieve a combined 100 GB/s transmission speed. The eight (8) fibers are attached to the transceiver according to the QSFP optical interface scheme using a multi-fiber connector, such as an MPO connector, with a twelve (12) fiber ferrule using only 8 channels for transmission.

In some cases, it is desirable to separate (i.e., breakout) the optical channels in order to use a single 40 GB/s parallel transceiver to drive four independent 10 GB/s communication channels. Conventional methods for achieving this include creating a furcated cable assembly harness which separates the 8 fibers from the MPO connector into four (4) duplex LC connectors (i.e., four pairs of fibers). As the fibers at the MPO are segregated into transmit and receive side channels in the optical interface scheme, there must be a pairing of the fibers in the harness to achieve proper signal communication for the receive and transmit channels. This solution adds bulk and complexity to the installation, and also introduces an additional fiber connection in the channel, which adds another optical joining point that contributes to the optical insertion loss of the network.

Thus, there is an unresolved need for other optical connectivity solutions.

SUMMARY

Embodiments of the disclosure include a fiber optic connector comprising a main connector body comprising a plurality of removable sub-connectors retained therein. Each sub-connector comprises a ferrule for retaining a pair of optical fibers, such as a transmit/receive pair for example. When the main connector body of the fiber optic connector is inserted into, for example, a complimentary receptacle, each of the optical fibers retained in each ferrule of the plurality of sub-connectors is optically connected to the fiber optic receptacle. In this manner, the fiber optic connector can connect and disconnect a plurality of optical fibers at once, similar to an MPO or other multi-fiber connector. Additionally, individual sub-connectors can be removed, rearranged and replaced from the main connector body without disturbing the optical connections of the other sub-connectors. This arrangement thus eliminates the need for breakout cables or other bulky solutions to convert between different multi-fiber and duplex applications.

One embodiment of the disclosure relates to a fiber optic connector. The fiber optic connector comprises a main connector body configured to be removably inserted and retained in a fiber optic receptacle. The fiber optic connector further comprises a plurality of sub-connectors each comprising a sub-connector body configured to be removably inserted and retained in the main connector body, and a ferrule configured to receive and retain at least one optical fiber pair of fibers (e.g., a transmit fiber and a receive fiber). Inserting the fiber optic connector into the fiber optic receptacle optically connects each of the optical pairs of fibers retained in each respective ferrule of the plurality of sub-connectors to the fiber optic receptacle.

An additional embodiment of the disclosure relates to a method of connecting a fiber optic connector to a receptacle. The method comprises removably inserting a plurality of sub-connectors into a main connector body, wherein each sub-connector comprises a ferrule retaining at least one optical fiber pair therein. The method further comprises removably inserting the main connector body into a receptacle, thereby optically connecting the optical fiber pairs of the sub-connectors to the receptacle.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a perspective view of the connector and receptacle of FIGS. 1A and 1B, illustrating insertion of an individual sub-connector into the main connector body of the connector;

FIGS. 12A and 12B illustrate a plurality of cable jumpers terminated at both ends by a plurality of sub-connectors disposed in a pair of connectors, according to an exemplary embodiment.

DETAILED DESCRIPTION

Embodiments of the disclosure include a fiber optic connector comprising a main connector body comprising a plurality of removable sub-connectors retained therein. Each sub-connector comprises a ferrule for retaining a pair of optical fibers. For example, each ferrule may include a transmit/receive pair of optical fibers. When the main connector body of the fiber optic connector is inserted into a receptacle, each of the optical fibers retained in each ferrule of the plurality of sub-connectors is optically connected to the fiber optic receptacle. In this manner, the fiber optic connector can connect and disconnect a plurality of optical fibers at once, similar to an MPO or other multi-fiber connector. Additionally, individual sub-connectors can be removed, rearranged and replaced in the main connector body without disturbing the optical connections of the other sub-connectors, which is similar to conventional networks that use a breakout cable assembly having LC Duplex or other duplex connectors. This arrangement thus eliminates the need for breakout cables or other bulky solutions to convert between different multi-fiber and duplex applications. Further, this arrangement eliminates a fiber optic joining point that can add to the optical insertion loss of the optical network.

Figure 1A:
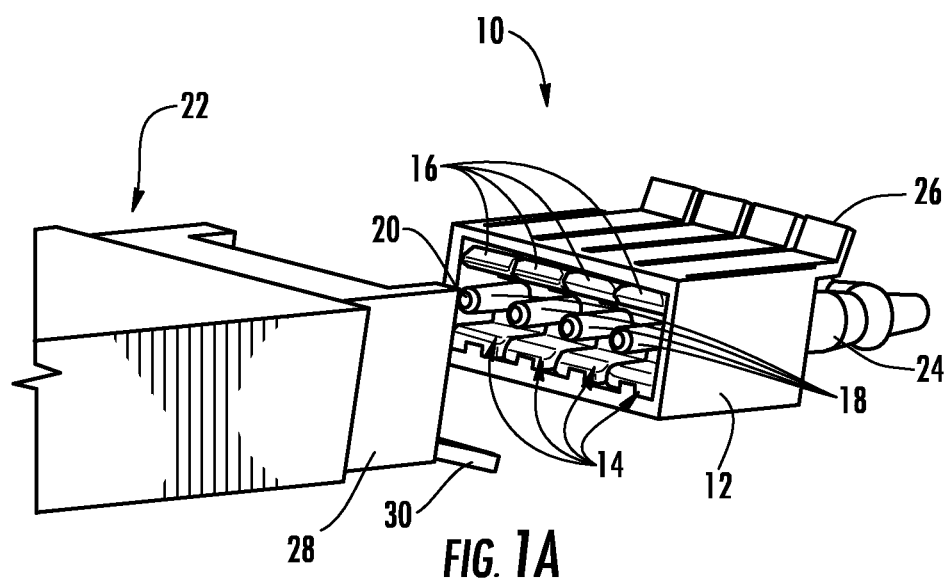
FIGS. 1A and 1B are perspective views of an exemplary fiber optic connector having a plurality of sub-connectors removably disposed therein, and a complementary receptacle, according to one embodiment.
Figure 1B:
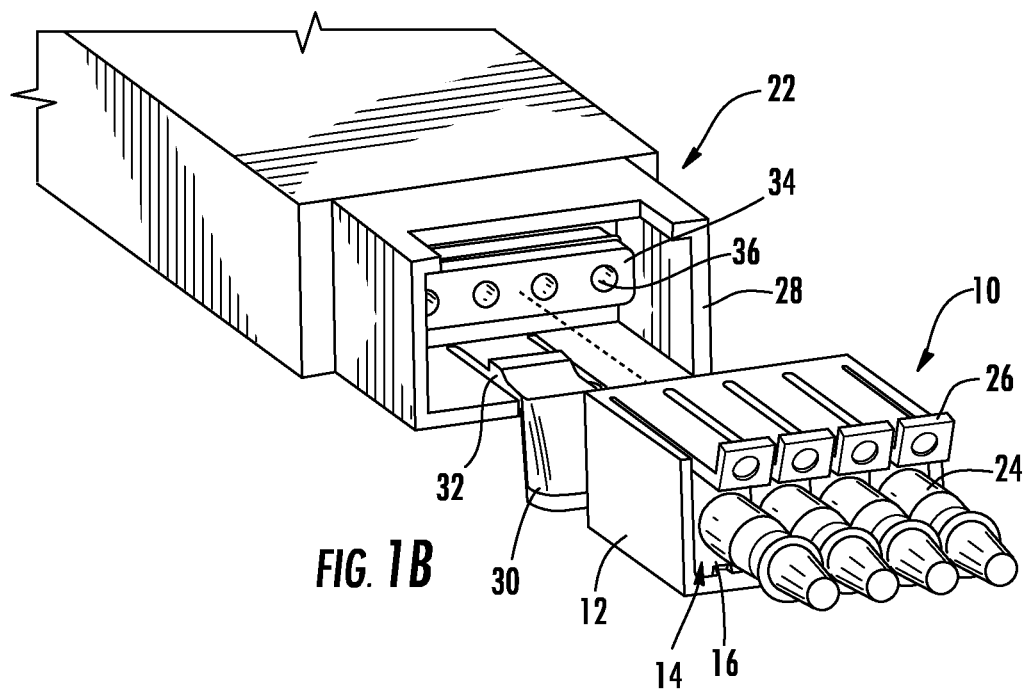

Various embodiments will be further clarified by the following examples. In this regard, FIGS. 1A and 1B illustrate a fiber optic connector 10 comprising a main connector body 12 having a plurality of removable sub-connectors 14 retained therein. Each sub-connector 14 comprises a sub-connector body 16 removably disposed in the main connector body 12, and a ferrule 18 for retaining a pair of optical fibers 20. By way of example, connector 10 can receive X sub-connectors 14 and may optically connect 2X optical fibers with each ferrule. However, other variations are possible according to the concepts disclosed such as a sub-connector with a ferrule that receives and retains four (4) optical fibers, thereby allowing further optical density and/or bandwidth. In this explanatory example, the connector can receive X sub-connectors 14 and may optically connect 4X optical fibers with each ferrule. Thus, the connector 10 can optical connect 2X or more fibers per ferrule of the sub-connector.

When the main connector body 12 of the fiber optic connector 10 is inserted into a complimentary receptacle 22, each of the optical fibers 20 retained in each ferrule 18 of the plurality of sub-connectors 14 is optically connected to the fiber optic receptacle 22. In this manner, the fiber optic connector 10 can connect and disconnect a plurality of optical fibers 20 at once, similar to an MPO or other multi-fiber connector. Further, individual sub-connectors 14 can be removed, rearranged and replaced from the main connector body 12 without disturbing the optical connections of the other sub-connectors 14. This arrangement thus eliminates the need for breakout cables or other bulky solutions to convert between different multi-fiber and duplex applications. In this embodiment, each sub-connector 14 has a strain relief boot 24, but other arrangements are possible. Connector 10 may be used as a substitute for the conventional MPO interface QSFP transceiver. One advantage of this connector 10 is that it eliminates the need for custom harnesses to achieve individual channel reconfigurable interconnection of parallel QSFP (or similar) transceivers. As transceiver speeds increase, this allows the user to configure the data center network more efficiently, running parallel links and single links where needed while using the same transceivers for either application.

The main connector body 12 also includes a plurality of sub-connector latch mechanisms 26. In this embodiment, each sub-connector latch mechanism 26 is a resilient tab that retains a respective sub-connector 14 in the main connector body 12. Similarly, receptacle 22 includes a receptacle body 28 that includes a receptacle latch mechanism 30. In this embodiment, the receptacle 22 also includes a receptacle latch mechanism 30, which includes another resilient tab for retaining the connector 10 in the receptacle 22.

As show in FIG. 1B, the receptacle includes a receptacle latch mechanism 30 including a resilient tab. The resilient tab in this embodiment also includes a protrusion 32 for engaging with a complementary recess (not visible) of the main connector body 12. When the connector 10 is inserted into the receptacle 22, the respective ferrules 18 of sub-connectors 14 mate with a complementary ferrule receptacle 34, with each individual ferrule 18 mating with a complementary bore 36. In this embodiment, the sub-connector latch mechanisms 26 and receptacle latch mechanism 30 are disposed on opposite sides of the connector 10. This reduces the chances of releasing the wrong latch by accident. Alternatively, or in addition, the latches 26, 30 may also include a push/pull and/or push to release mechanism to enhance handling.

In use, the connector 10 may be plugged in to a receptacle 22 such as a compatible transceiver or a connector-connector adapter. The plurality of optical fibers 20 extending from each sub-connector 14 may be individually enclosed by respective cables and/or may be bundled in a harness or other assembly (described below with respect to FIGS. 12A and 12B). The optical fibers 20 terminated by the connector 10 may lead to a similar connector 10 at a similar receptacle 22 for a parallel optical link, or it may lead to one or more other types of connectors. For example, the optical fibers 20 may be terminated with a like sub-connector, or with a conventional LC-duplex connector to make use of standard Small Form-factor Pluggable (SFP+) transceivers.

Turning now to FIG. 2, a perspective view of the connector 10 and receptacle 22 is shown, illustrating insertion of an individual sub-connector 14 into the main connector body 12 in particular. As can be seen in FIG. 2, each sub-connector 14 includes a sub-connector body 16 having an open recess 38 for receiving the ferrule 18 and the pair of optical fibers 20 (not shown in FIG. 2). In this embodiment, the sub-connector 14 is open on at least one side, in order to accommodate assembly of the sub-connector 14, as well as to reduce the overall size of the sub-connector 14. The ferrule 18 is biased within the sub-connector body 16 by at least one spring 40 in this embodiment, but could be fixed in other variations. In addition, each sub-connector 14 includes at least one alignment feature, such as alignment groove 42 in this example, which may slidably mate with a complimentary alignment feature such as a tongue 44 protruding from an inner surface of the main connector body 12.

Figure 3:
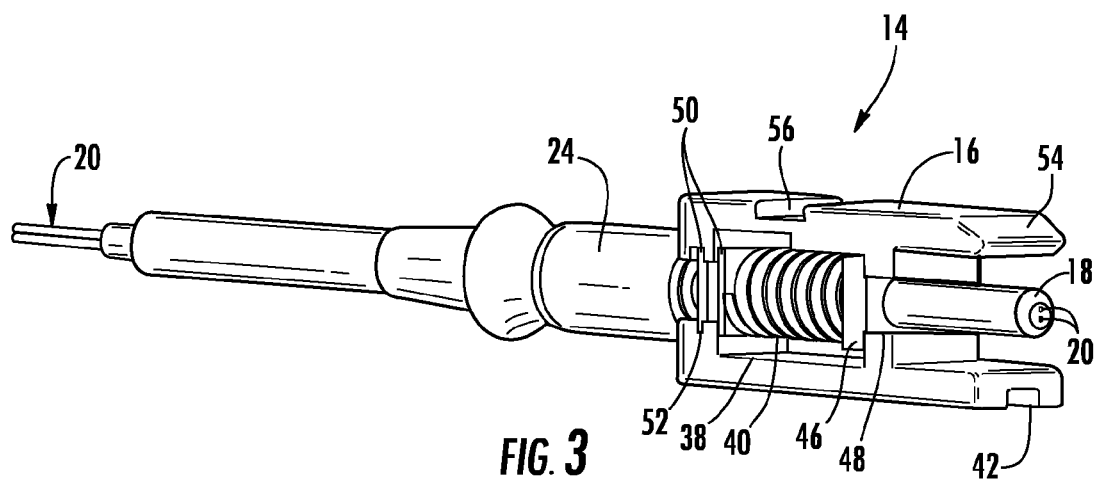
FIG. 3 is a detailed perspective view of an individual sub-connector according to the embodiment of FIG. 2.

Turning now to FIG. 3, a detailed perspective view of an individual sub-connector 14 is illustrated. As shown, spring 40 is disposed within recess 38 and is held in place by stop 46, which is abutted against an edge of groove 48 and stops 50, which are abutted and inserted around groove 52. In addition to alignment groove 42, the sub-connector body 16 also includes an insertion alignment feature 54, such as a tapered surface for guiding the ferrule into the main connector body 12 and/or the receptacle body 28. FIG. 3 also illustrates a recess 56 for receiving a complementary protrusion (not visible) of the resilient sub-connector latch mechanism 26 (not visible) of main connector body 12 when fully inserted therein.

Figure 4:
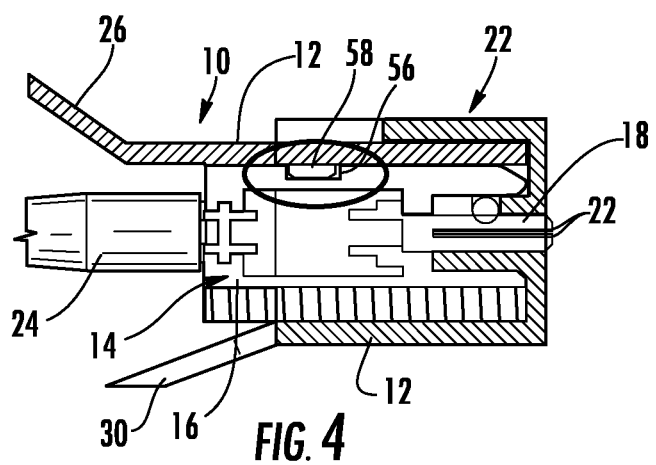
FIG. 4 is a cross-sectional view of the sub-connector of FIGS. 2 and 3 removably disposed in the main connector body, wherein the sub-connector is retained in the main connector body by a sub-connector latch mechanism.

In this regard, FIG. 4 shows a cross-section of the connector 10 inserted into receptacle 22. In particular, FIG. 4 illustrates a protrusion 58 of sub-connector latch mechanism 26 seated within recess 56 of the sub-connector 14. In this manner, each sub-connector 14 may be securely yet removably disposed within the main connector body 12. Of course, other variations for securing the sub-connector are possible.

Figure 5:
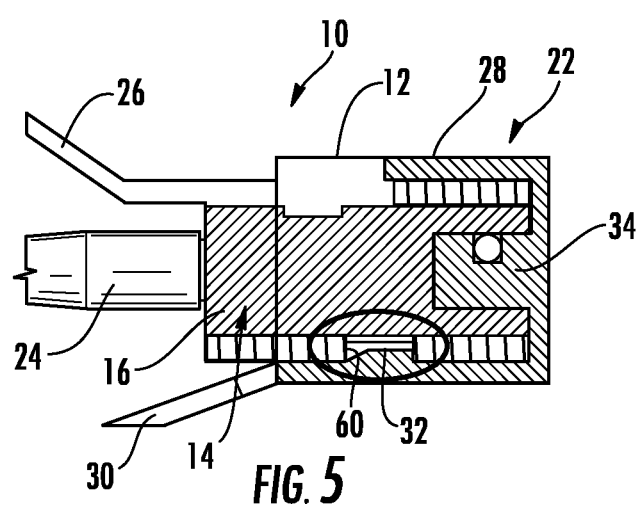
FIG. 5 is a cross-sectional view of the connector of FIGS. 1A-3 removably disposed in the receptacle, wherein the connector is retained in the receptacle body by a receptacle latch mechanism.

For instance, FIG. 5 illustrates another cross-section of the connector 10 inserted into the receptacle 22. In this figure, protrusion 32 is illustrated as being seated within recess 60 of the main connector body 12. In this manner, the main connector body 12 is also securely, yet removably disposed within the receptacle body 28.

Figure 6:
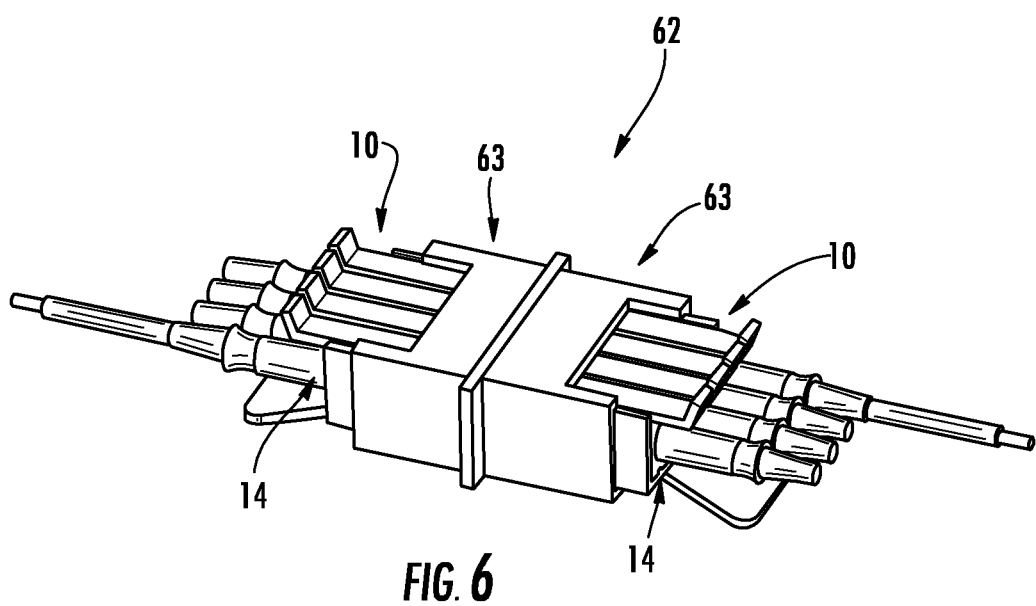
FIG. 6 illustrates a pair of connectors of FIGS. 1A-3 disposed in a fiber optic adapter for optically connecting a pair of connectors to each other.

The above-referenced embodiments allow for many versatile connection schemes. For example, FIG. 6 illustrates an adapter receptacle 62 having a pair of opposed adapter bodies 63. Each receptacle body accommodates a connector 10, which may be inserted or removed from the adapter body 63. Consequently, a first connector 10 may be optically coupled to a second connector 10 in the desired configuration, which may be easily reconfigured if desired. Alternatively, individual sub-connectors 14 may also be individually removed and/or replaced from connector 10 without disturbing the other sub-connector connections. The polarity of the mating connectors can be maintained by rearranging the sub-connectors 14 within the main connector body 12 as desired.

Figure 7:
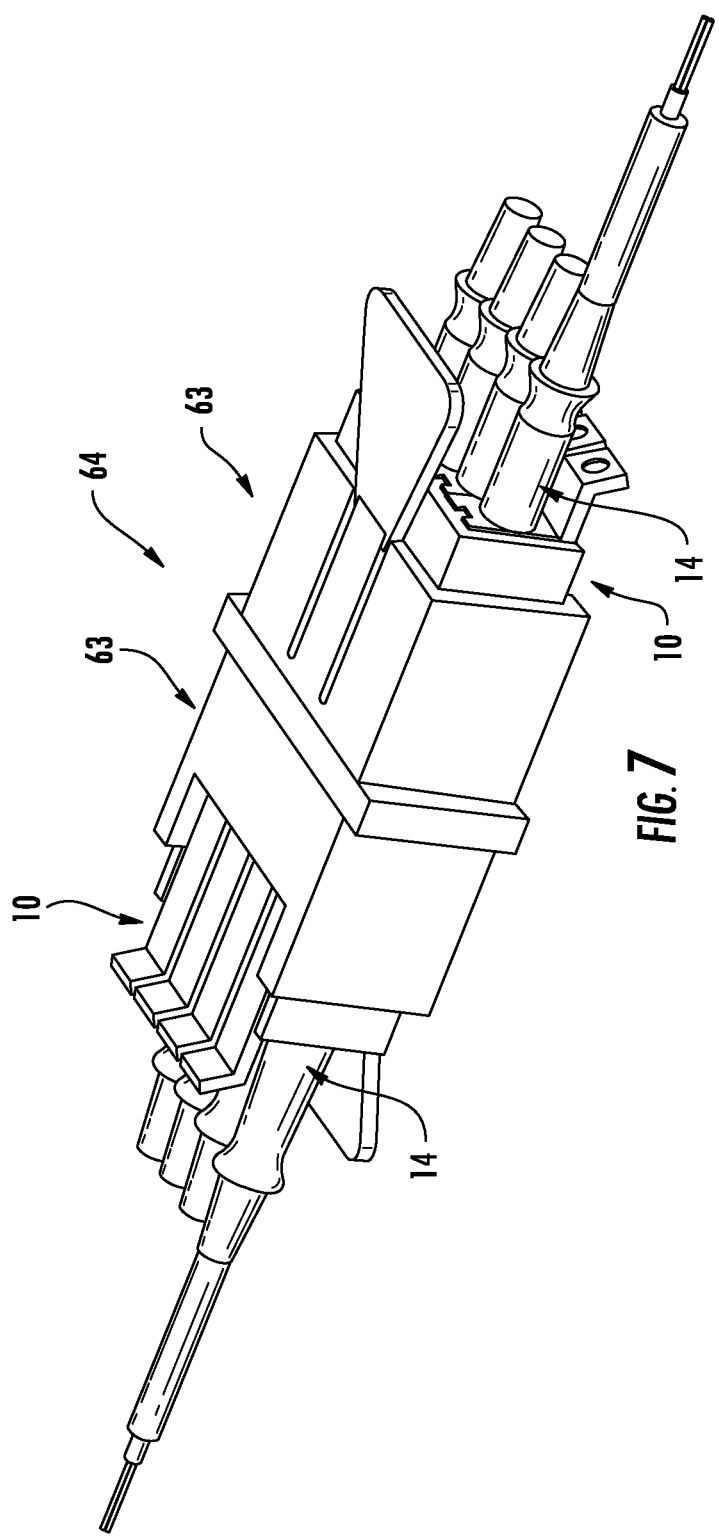
FIG. 7 illustrates a pair of connectors of FIGS. 1A-3 disposed in a fiber optic adapter for optically connecting a pair of connectors to each other in an alternative polarity scheme.

FIG. 7 illustrates an alternative adapter receptacle 64 that maintains polarity between transmit and receive channels of each respective connector 10 by disposing the main connector bodies 12 in a "flipped" arrangement. In particular, by mating the fiber optic connectors 10 up-to-down and down-to-up (see the orientation of the latches in the images), each transmit channel is mated with a respective receive channel, and vice versa, when the connectors 10 are removably inserted into the adapter receptacle 64.

Figure 8:
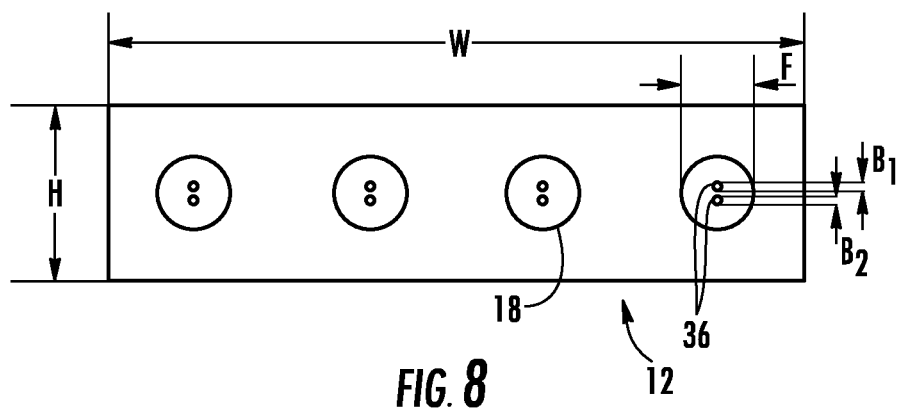
FIG. 8 is a simplified schematic view of the connector of FIGS. 1A-3 illustrating the dimensions and spacing of the main connector body, ferrules, and optical fibers, such that the connector has a similar cross-sectional area as a standard MPO/MTP connector, according to an exemplary embodiment.

FIG. 8 is a simplified schematic view of the connector of FIGS. 1A-3 illustrating the dimensions and spacing of the main connector body, ferrules, and optical fibers, such that the connector has a similar cross-sectional area to a standard MPO/MTP connector, according to an exemplary embodiment. In this regard, in this embodiment, main connector body 12 has a cross-sectional width W of approximately 12 millimeters (mm), and a cross-sectional height H of approximately 3 mm. Each ferrule 18 has a cross-sectional diameter F of approximately 1.25 mm, and each ferrule bore 36 has a cross-sectional diameter B1, B2 sized to accommodate one or more optical fibers, which have a diameter of 125 µm in this embodiment. Of course, the concepts disclosed herein may be used with components and assemblies having other suitable dimensions.

Figure 9:
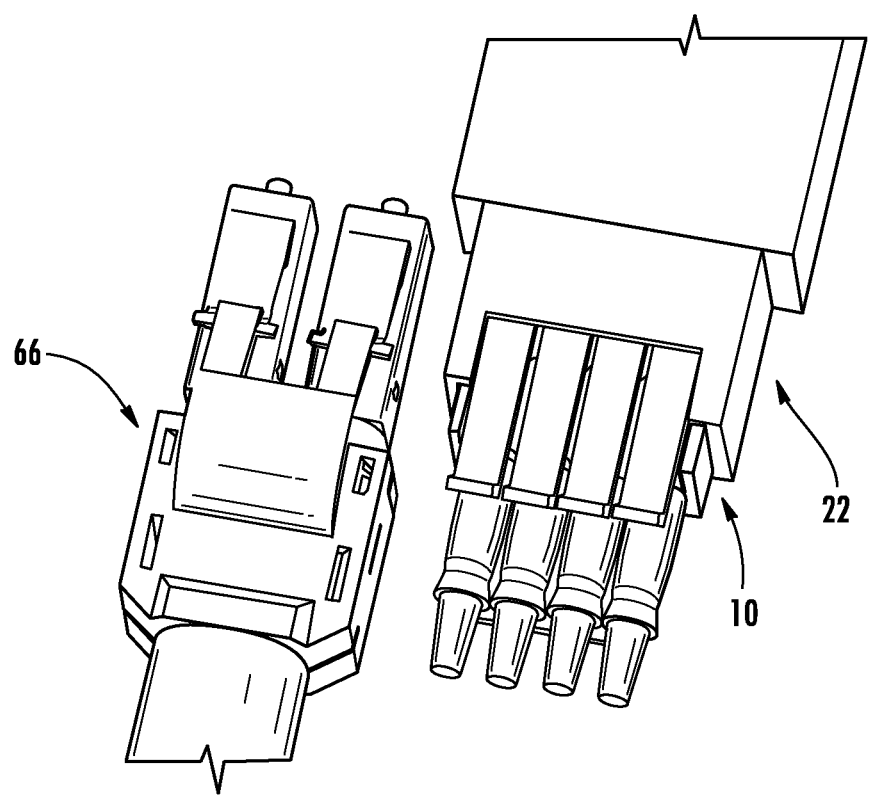
FIG. 9 illustrates a perspective view of the connector of FIGS. 1A-3 alongside a conventional LC duplex connector, in which the connector has a similar size to the LC duplex connector, according to an exemplary embodiment.

FIG. 9 illustrates the small form factor of an exemplary embodiment of connector 10 and receptacle 22 disclosed herein compared with a conventional duplex connector. In this regard, connector 10 and receptacle 22 are illustrated alongside a conventional LC duplex connector 66, to illustrate the similar size of the respective connectors.

Figure 10A:
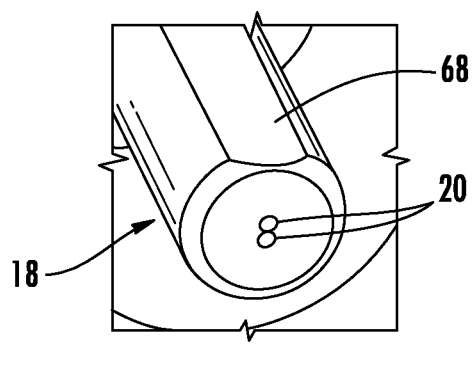
FIGS. 10A and 10B illustrate perspective views of an exemplary sub-connector ferrule, according to a pair of alternative embodiments, illustrating respective vertical and horizontal arrangement of a pair of optical fibers in the respective ferrule, and illustrating an exemplary anti-rotation feature of the ferrules.
Figure 10B:
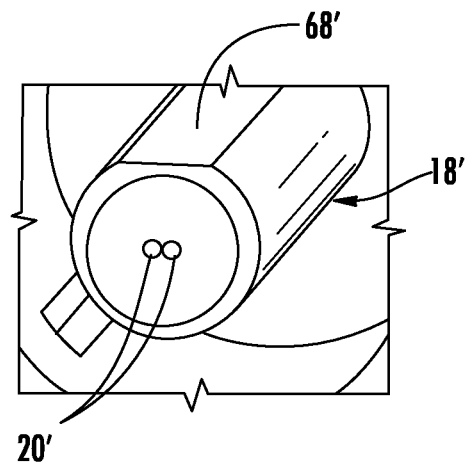

In order to keep the pairs of optical fibers 20 and respective ferrules 18 aligned with respect to each other, i.e., "properly orientated" with each other, and with respect to the receptacle 22, each ferrule 18 may include a rotational alignment feature for maintaining rotational alignment of the ferrule 18 within the receptacle 22. In this regard, FIGS. 10A and 10B illustrate alternative embodiments of ferrule 18. In FIG. 10A, optical fibers 20 are arranged in a vertical linear array within the ferrule 18. In this manner, when the four ferrules 18 of the respective sub-connectors 14 are disposed in the main connector body 12, the optical fiber pairs 20 will define two parallel horizontal linear arrays of optical fibers across the ferrule end faces, thereby defining a relatively dense eight (8) fiber port configuration. To maintain rotational alignment of each individual ferrule 18, the ferrule 18 includes a flat rotational alignment face 68 that mates with a complimentary flat alignment face (not shown) in the receptacle ferrule bore 36.

Similarly, FIG. 10B illustrates an alternative ferrule 18' having a pair of optical fibers 20' arranged in a horizontal linear array in the ferrule 18'. In this manner, when the sub-connectors 14 are inserted in the main connector body 12, the pairs of optical fibers 20' form a single horizontal linear array of eight fibers across the ferrule end faces. One advantage of this arrangement is that complementary optical interfaces in the receptacle may all be disposed in a common plane, thereby reducing fabrication and/or assembly costs of the receptacle 22.

Figure 11:
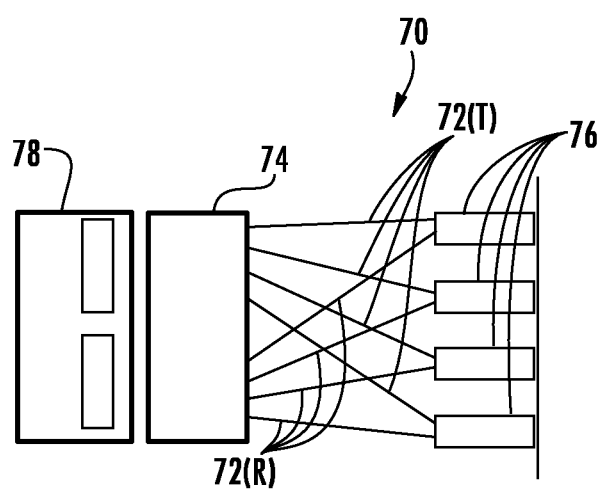
FIG. 11 illustrates a schematic view of an exemplary conversion assembly for connecting the connector of FIGS. 1A-3, which has four ferrules each having a discrete transmit/receive channel, to a multi-fiber connector having a parallel optical configuration.

It may also be desirable to convert between the port configurations of the embodiments described herein and the port configurations of conventional multi-fiber connectors, such as an MTP or MPO connector. In this regard, FIG. 11 illustrates a schematic view of an exemplary conversion assembly 70 for connecting the connector 10 with a conventional multi-fiber equipment 78 such as connecting with a MPO connector. In this regard, conversion assembly 70 includes a plurality of transmit and receive fibers 72T, 72R connected between respective transmit and receive locations of discrete transmit/receive channel pairs 76, for connecting with the transmit/receive pairs of optical fibers 20 of the sub-connectors 14 of the connector 10 described above, and transmit/receive locations of a conventional parallel optical configuration 74, such as a 12-fiber MPO or MTP connection scheme employing a base-8 configuration.

Figure 12B:
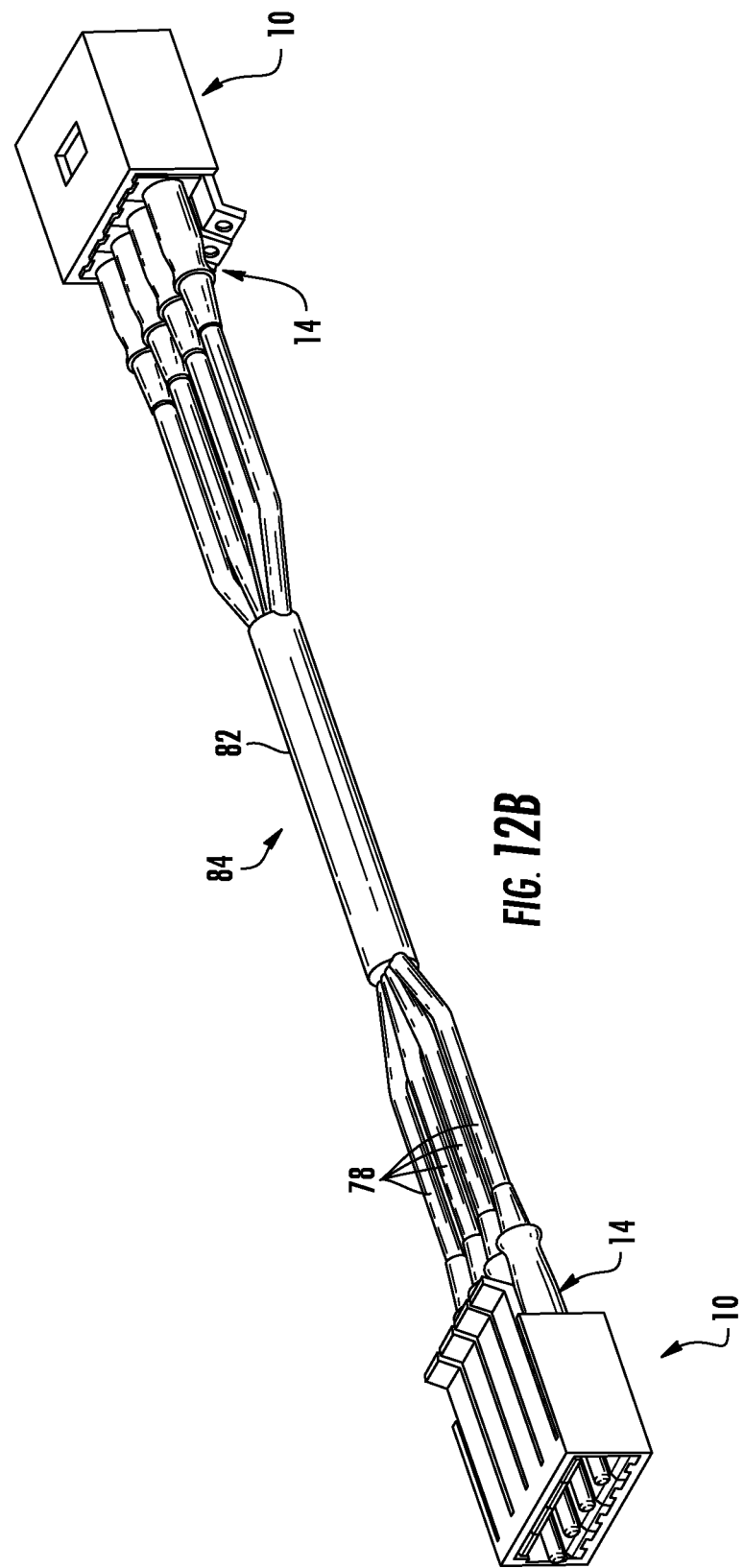

In some embodiments, it may be desirable to assemble a plurality of duplex (2f) cable jumpers 78 each terminated with a sub-connector 14 between a pair of connectors 10 to form a combined cable jumper 80, as illustrated in FIG. 12A. FIG. 12B illustrates a similar configuration, with the plurality of duplex cable jumpers 78 being enclosed by a cable jacket 82 to form a combined multi-fiber (8f) cable 84. The cable jacket 84 can be stripped away as needed to expose and terminate the individual duplex cable jumpers 78, as needed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic connector comprising:
    a main connector body configured to be removably inserted and retained in a fiber optic receptacle, the main connector body comprising a plurality of sub-connector latch mechanisms extending from a side of the main connector body, wherein each sub-connector latch mechanism comprises a protrusion; and
    a plurality of sub-connectors each comprising:
        a sub-connector body configured to be removably inserted and retained in the main connector body, the sub-connector body comprising a recess for receiving at least a portion of the protrusion of an individual sub-connector latch mechanism when the sub-connector body is inserted into the main connector body; and
        a ferrule configured to receive and retain at least one optical fiber pair;
    wherein inserting the fiber optic connector into the fiber optic receptacle optically connects each of the at least one optical fiber pair retained in each ferrule of the plurality of sub-connectors to the fiber optic receptacle.

2. The connector of claim 1, wherein the plurality of sub-connectors are interchangeable with each other in the main connector body.

3. The connector of claim 1, wherein the at least one optical fiber pair of the sub-connectors of the fiber optic connector together define a parallel optic multi fiber configuration.

4. The connector of claim 3, wherein each of the at least one optical fiber pair defines a duplex pair configuration.

5. The connector of claim 1, wherein each of the at least one optical fiber pair defines a duplex pair configuration.

6. The connector of claim 1, wherein the plurality of sub-connectors comprises four (4) sub-connectors.

7. The connector of claim 6, wherein the main connector body is has a cross-sectional width of approximately 12 mm, and a cross-sectional height of approximately 3 mm.

8. The connector of claim 7, wherein each ferrule has a cross-sectional diameter of approximately 1.25 mm.

9. The connector of claim 1, wherein each of the at least one optical fiber pair is arranged in a horizontal array in the ferrule, such that a plurality of pairs of optical fibers defines a single horizontal linear array.

10. The connector of claim 1, wherein each of the at least one optical fiber pair is arranged in a vertical array in the ferrule, such that a plurality of pairs of optical fibers defines a pair of parallel horizontal linear arrays.

11. The connector of claim 1, further comprising a receptacle latch mechanism for retaining the main connector body in the fiber optic receptacle.

12. The connector of claim 11, wherein the receptacle latch mechanism comprises a tab connected to one of the fiber optic receptacle and the main connector body, and a recess for receiving a portion of the tab in the other of the fiber optic receptacle and main connector body for releasing the main connector body from the fiber optic receptacle.

13. The connector of claim 1, wherein each of the plurality of sub-connectors comprises at least one spring configured to bias the ferrule against the fiber optic receptacle when the main connector body is inserted in the fiber optic receptacle.

14. The connector of claim 1, wherein each sub-connector body has an exposed recess on at least one side of the sub-connector body that allows side access to the ferrule and a pair of optical fibers.

15. A method of connecting a fiber optic connector to a fiber optic receptacle comprising:
    removably inserting a plurality of sub-connectors into a main connector body, wherein:
        the main connector body comprises a plurality of sub-connector latch mechanisms extending from a side of the main connector body, each sub-connector latch mechanism comprising a protrusion;
        the main connector body further comprises a recess on a side of the main connector body that is opposite from the side of the main connector body comprising the plurality of latch mechanism; and
        each of the plurality of sub-connectors comprises a sub-connector body comprising a recess for receiving at least a portion of the protrusion of an individual sub-connector latch mechanism when the sub-connector body is inserted into the main connector body, and a ferrule retaining at least one optical fiber pair therein; and
    removably inserting the main connector body into a fiber optic receptacle comprising a receptacle latch mechanism comprising a protrusion such that the protrusion of the receptacle latch mechanism is disposed within the recess of the main connector body, thereby optically connecting the at least one optical fiber pairs of the plurality of sub-connectors to the fiber optic receptacle.

16. The method of claim 15 further comprising:
    removing at least one of the plurality of sub-connectors from the main connector body by releasing an individual sub-connector latch mechanism corresponding to the at least one of the plurality of sub-connectors, thereby optically disconnecting the at least one of the plurality of sub-connector from a portion of the fiber optic receptacle; and removably inserting at least one different sub-connector in the main connector body such that the protrusion of the individual sub-connector latch mechanism is disposed within the recess of the sub-connector body of the at least one different sub-connector, thereby optically connecting the at least one different sub-connector with the portion of the fiber optic receptacle.

17. An optical connection comprising:
a fiber optic connector comprising:
  a main connector body comprising a recess disposed within a side of the main connector body; and
  a plurality of sub-connectors each comprising:
    a sub-connector body configured to be removably inserted and retained in the main connector body; and
    a ferrule configured to receive and retain two or more optical fibers;
a fiber optic receptacle comprising a receptacle latch mechanism configured as a resilient tab comprising a protrusion, wherein inserting the fiber optic connector into the fiber optic receptacle causes the protrusion of the resilient tab to be disposed within the recess of the main connector body, and optically connects each of the two or more optical fibers retained in each ferrule of the plurality of sub-connectors to the fiber optic receptacle.

18. The optical connection of claim 17, wherein each of the plurality of sub-connectors comprises at least one spring configured to bias the ferrule against the fiber optic receptacle when the main connector body is inserted in the fiber optic receptacle.

19. An optical connection comprising:
a fiber optic connector comprising:
  a main connector body comprising:
    a plurality of sub-connector latch mechanisms extending from a side of the main connector body, each sub-connector latch mechanism comprising a protrusion; and
    a recess on a side of the main connector body that is opposite from the side of the main connector body comprising the plurality of latch mechanism; and
  a plurality of sub-connectors each comprising:
    a sub-connector body configured to be removably inserted and retained in the main connector body, the sub-connector body comprising a recess for receiving at least a portion of the protrusion of an individual sub-connector latch mechanism when the sub-connector body is inserted into the main connector body; and
    a ferrule configured to receive and retain at least one optical fiber pair; and
a fiber optic receptacle comprising a receptacle latch mechanism configured as a resilient tab comprising a protrusion, wherein inserting the fiber optic connector into the fiber optic receptacle causes the protrusion of the resilient tab to be disposed within the recess of the main connector body such that the receptacle latch mechanism and the plurality of sub-connector latch mechanisms are on opposite sides of the main connector body, and each of the two or more optical fibers retained in each ferrule of the plurality of sub-connectors are optically coupled tothe fiber optic receptacle.

* * * * *